(12) United States Patent
Huang

(10) Patent No.: US 11,620,469 B2
(45) Date of Patent: *Apr. 4, 2023

(54) BAR CODE GENERATION SCANNING, AND DISPLAY METHOD, APPARATUS, STORAGE MEDIUM, AND ELECTRONIC DEVICE

(71) Applicant: Tencent Technology (Shenzhen) Company Limited, Shenzhen (CN)

(72) Inventor: Yehui Huang, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/497,248

(22) Filed: Oct. 8, 2021

(65) Prior Publication Data

US 2022/0027591 A1 Jan. 27, 2022

Related U.S. Application Data

(63) Continuation of application No. 16/993,993, filed on Aug. 14, 2020, now Pat. No. 11,347,954, which is a (Continued)

(30) Foreign Application Priority Data

May 7, 2018 (CN) .......................... 201810427253.5

(51) Int. Cl.
*G06K 9/18* (2006.01)
*G06K 7/14* (2006.01)
(Continued)

(52) U.S. Cl.
CPC ........... *G06K 7/1413* (2013.01); *G06K 1/121* (2013.01); *G06K 19/06028* (2013.01)

(58) Field of Classification Search
USPC ............ 235/462.01, 462.15, 462.45, 472.01
See application file for complete search history.

(56) References Cited

U.S. PATENT DOCUMENTS

| 5,777,315 A | 7/1998 | Wilz et al. |
| 7,702,162 B2 | 4/2010 | Cheong et al. |

(Continued)

FOREIGN PATENT DOCUMENTS

| CN | 102929595 A | 2/2013 |
| CN | 104143108 A | 11/2014 |

(Continued)

OTHER PUBLICATIONS

International Search Report and Written Opinion for International Application No. PCT/CN2019/082595 dated Jul. 16, 2019; 12 pages.

(Continued)

*Primary Examiner* — Daniel St Cyr
(74) *Attorney, Agent, or Firm* — Crowell & Moring LLP

(57) ABSTRACT

This application discloses method, an apparatus, a storage medium, and an electronic device for bar code generation and display. The method includes: obtaining a target code by compiling a source code, the target code being self-contained executable code comprising target computer readable instructions and comprising logic functions, wherein the target computer readable instructions are executable by a processor; and generating a target bar code embedded with the target code by encoding the target code, wherein the target code comprises at least one of the following logical functions: a first logical function for allowing a scanning device with a read permission to run the target code, a second logical function for allowing the target code to be run within a validity period, and a third logical function for (Continued)

calling and configuring target hardware in the scanning device to execute a target operation.

17 Claims, 8 Drawing Sheets

Related U.S. Application Data continuation of application No. PCT/CN2019/082595, filed on Apr. 15, 2019.

(51) Int. Cl.
*G06K 1/12* (2006.01)
*G06K 19/06* (2006.01)

(56) References Cited

U.S. PATENT DOCUMENTS

| | | | |
|---|---|---|---|
| 8,807,434 | B1 | 8/2014 | Windmueller et al. |
| 8,851,382 | B2 | 10/2014 | Powers et al. |
| 8,944,321 | B1 | 2/2015 | Patterson |
| 8,967,457 | B2 | 3/2015 | Shin et al. |
| 9,038,910 | B2 | 5/2015 | Yang et al. |
| 11,347,954 | B2 * | 5/2022 | Huang ............ G06K 7/1413 |
| 2011/0014905 | A1 | 1/2011 | Eschenauer et al. |
| 2012/0104084 | A1 | 5/2012 | Wang et al. |
| 2013/0173435 | A1 | 7/2013 | Cozad, Jr. |
| 2015/0090781 | A1 | 4/2015 | Yang |
| 2015/0178721 | A1 | 6/2015 | Pandiarajan et al. |

FOREIGN PATENT DOCUMENTS

| | | |
|---|---|---|
| CN | 105139059 A | 12/2015 |
| CN | 105141488 A | 12/2015 |
| CN | 106919873 A | 7/2017 |
| JP | 2002-512709 A | 4/2002 |
| JP | 2005-191638 A | 7/2005 |
| JP | 2007-166487 A | 6/2007 |
| JP | 2014-30902 A | 2/2014 |
| WO | WO 2014/044139 A1 | 3/2014 |

OTHER PUBLICATIONS

Office Action with English Translation of Concise Explanation of Relevance for Chinese Patent Application No. 201810427253.5 dated Apr. 23, 2021; 12 pages.

Wang, Jingzhong et al., "A Security Research on Smart Phone Access Control System Based on QR Code Hybrid Encryption Technology", Netinfo Security, vol. 12, Dec. 31, 2015, p. 8-13.

Extended European Search Report for European Patent Application No. 19798998.1 dated May 31, 2021; 9 pages.

Japanese Office Action with English Translation of Notice of Reasons for Refusal for Japanese Patent Application No. 2020-546098 dated Nov. 16, 2021, 14 pages.

Fumitaka Osawa, "Easy programming without a computer in the "SL4A" environment!", Programming with Android First Edition, First Edition, Japan, Engineering Co., Ltd., 2012, Mar. 20, 2014, 3-18, 45-50, 154-157.

* cited by examiner

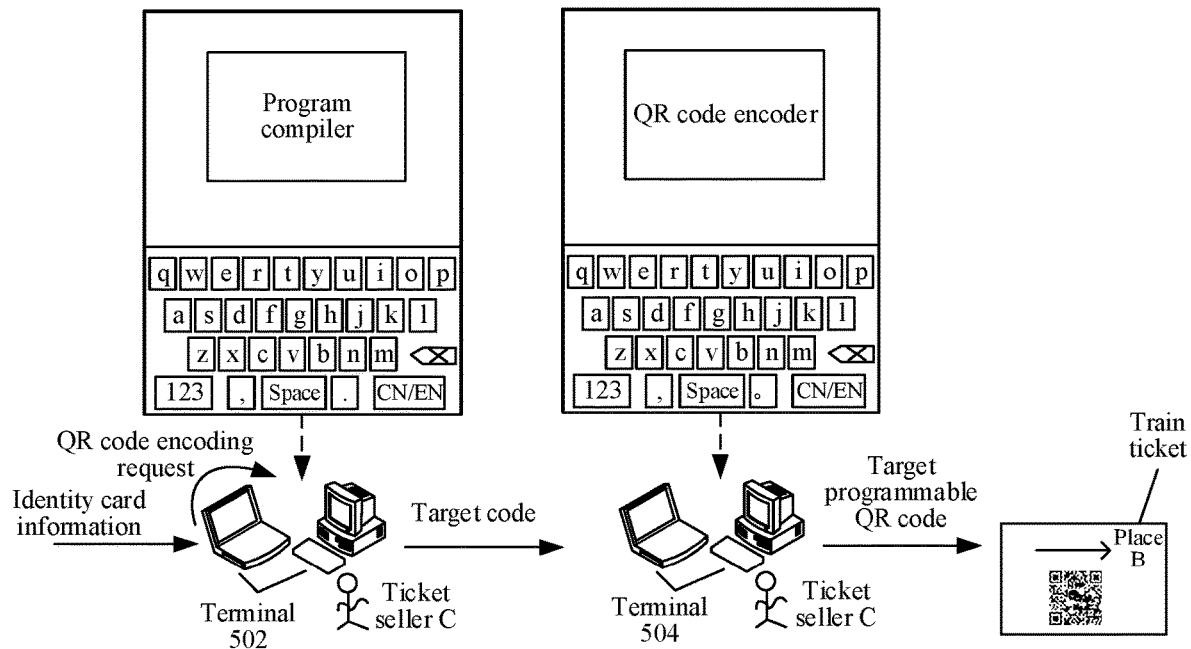
FIG. 5
```
v_curTime=v_d.getTime();v_str='2012-08-12 23:13:15';v_date=Date(v_str);v_startTime=v_date.getTime();
if(v_d-v_date<1*60*1000);java.lang.System.out.println('valid');else;java.lang.System.out.println('invalid');
```
FIG. 6
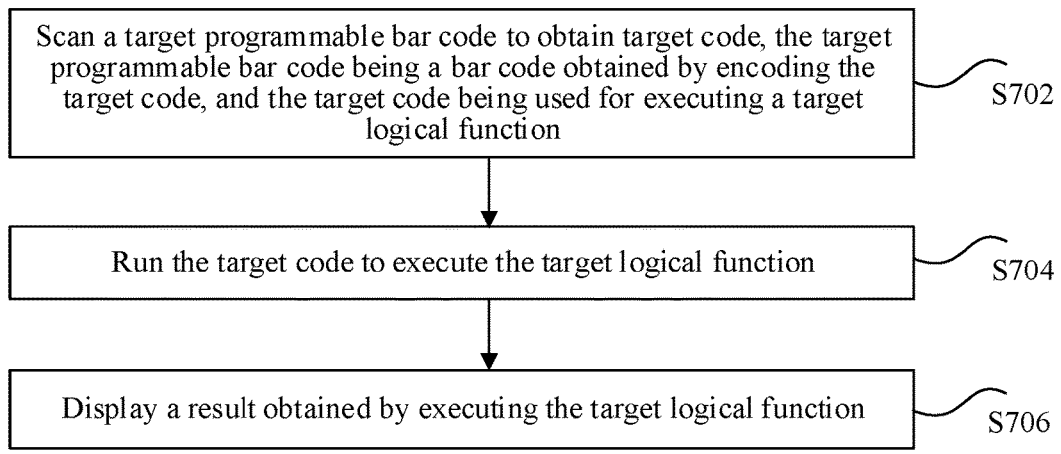
FIG. 7

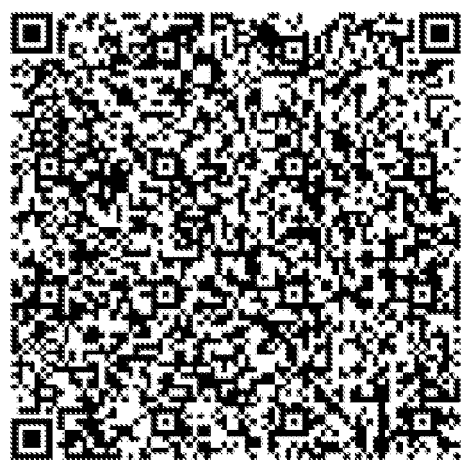

FIG. 10

```
Problems  Javadoc  Declaration  Search  Console
<terminated> Sample [Java Application] C:\Program Files\Java\jre1.8.0_121\bin\javaw.exe (2018年2月26日 下午4:12:40)
var v_d=new Date()
var v_curTime=v_d.getTime()
var v_str='2012-08-12 23:13:15'
var v_date=new Date(v_str)
var v_startTime=v_date.getTime()
if(v_d.getTime()-v_date.getTime()<1*60*1000){java.lang.System.out.println('valid')
}else{java.lang.System.out.println('invalid')}
```

FIG. 11

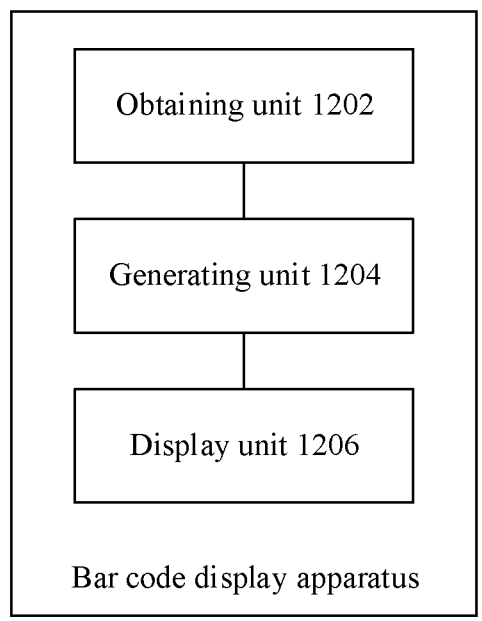

FIG. 12

BAR CODE GENERATION SCANNING, AND DISPLAY METHOD, APPARATUS, STORAGE MEDIUM, AND ELECTRONIC DEVICE

RELATED APPLICATION

This application is a continuation application of U.S. application Ser. No. 16/993,993, filed on Aug. 14, 2020, which is a continuation application of the International PCT Application No. PCT/CN2019/082595, filed with the China National Intellectual Property Administration, PRC on Apr. 15, 2019 which claims priority to Chinese Patent Application No. 201810427253.5, entitled "BAR CODE DISPLAY METHOD, BAR CODE DISPLAY APPARATUS, STORAGE MEDIUM, AND ELECTRONIC DEVICE" and filed with the China National Intellectual Property Administration, PRC on May 7, 2018, which are incorporated herein by reference in their entireties.

FIELD OF THE TECHNOLOGY

This application relates to the field of computer and information technologies, and specifically, to the bar code generating, scanning, and display.

BACKGROUND OF THE DISCLOSURE

At present, bar codes have been widely used in different scenarios. For example, a terminal may directly display static information carried therein by scanning a bar code, and the static information is reflected by numerical data, text description, or the like.

The static information displayed by the terminal is often numerical data or text description in a static form. For example, when the bar code carries a URL link, the terminal scans the bar code through a built-in application. After the scanning, a to-be-accessed URL link is displayed. The terminal then needs to follow the URL link through the application to obtain corresponding content information triggered by human interaction. Therefore, the content information corresponding to the page link cannot be displayed automatically by just scanning the QR code. That is, in the bar code display method provided in the related art, there is a problem that information carried in a bar code is static and relatively simple, and subsequent user action needs to be taken to retrieve full information.

For the foregoing problem, no effective solutions have been put forward so far.

SUMMARY

Embodiments of this application provide a method, an apparatus, a storage medium, and an electronic device for bar code generating, scanning, and display, to resolve at least the technical problem in the related art that information carried in a bar code is relatively simple.

According to an aspect of the embodiments of this application, a bar code generating and display method applied to a terminal is provided, including: obtaining a programmable bar code encoding request; generating a target programmable bar code in response to the programmable bar code encoding request, the target programmable bar code being a bar code obtained by encoding target code, and the target code being used for executing a target logical function; and displaying the foregoing target programmable bar code.

According to another aspect of the embodiments of this application, a bar code scanning method applied to a terminal is further provided, including: scanning a target programmable bar code to obtain target code, the target programmable bar code being a bar code obtained by encoding the target code, and the target code being executable binary code or source code used for executing a target logical function; running the foregoing target code to execute the foregoing target logical function; and displaying a result obtained by executing the foregoing target logical function.

According to another aspect of the embodiments of this application, a bar code generating and display apparatus is further provided, including: an obtaining unit, configured to obtain a programmable bar code encoding request; a generating unit, configured to generate a target programmable bar code in response to the foregoing programmable bar code encoding request, the target programmable bar code being a bar code obtained by encoding target code, and the target code being used for executing a target logical function; and a display unit, configured to display the foregoing target programmable bar code.

According to another aspect of the embodiments of this application, a bar code scanning apparatus applied is further provided, including: a scanning unit, configured to scan a target programmable bar code to obtain target code, the target programmable bar code being a bar code obtained by encoding the foregoing target code, and the target code being used for executing a target logical function; a running unit, configured to run the foregoing target code to execute the target logical function; and a display unit, configured to display a result obtained by executing the foregoing target logical function.

According to still another aspect of the embodiments of this application, a storage medium is further provided, the storage medium storing a computer program, the computer program being configured to perform, during running, the foregoing method.

According to still another aspect of the embodiments of this application, an electronic device is further provided, including a memory, a processor, and a computer program that is stored on the memory and that can be run on the processor, the processor being configured to perform, through the computer program, the foregoing method.

In the embodiments of this application, a displayed programmable bar code is obtained by encoding target code, that is, information carried in the programmable bar code is the target code. Because the target code supports logical judgments and algorithms, the target code can implement corresponding logical functions, and expand the range of information carried in a bar code, so that the programmable bar code is applicable to more complex scenarios and has more abundant applications. For example, the programmable bar code may carry software applications which may be executed once decoded. Therefore, the embodiments of this application resolve the technical problem in the related art that information carried in a bar code is static and relatively simple.

BRIEF DESCRIPTION OF THE DRAWINGS

The accompanying drawings described herein are used for providing further understanding for this application, and constitute a part of this application. Exemplary embodiments of this application and descriptions thereof are used for explaining this application and do not constitute an improper limitation to this application. In the accompanying drawings:

FIG. 5 is a schematic diagram of an optional programmable QR code display method according to an embodiment of this application.

FIG. 6 is a schematic diagram of optional instance code according to an embodiment of this application.

FIG. 7 is a schematic flowchart of another optional bar code display method according to an embodiment of this application.

FIG. 10 is a schematic diagram of an optional programmable QR code according to an embodiment of this application.

FIG. 11 is a schematic diagram of code obtained by converting optional instance code through a virtual machine according to an embodiment of this application;

FIG. 12 is a schematic structural diagram of an optional bar code display apparatus according to an embodiment of this application.

DESCRIPTION OF EMBODIMENTS

To make a person skilled in the related art better understand solutions of this application, the following clearly and completely describes the technical solutions in embodiments of this application with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

In the specification, claims, and the foregoing accompanying drawings of this application, the terms "first", "second", and so on are intended to distinguish between similar objects rather than indicating a specific order. It is to be understood that the data termed in such a way are interchangeable in proper circumstances, so that the embodiments of this application described herein can be implemented in orders except the order illustrated or described herein. In addition, the terms "include", "comprise" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

According to an aspect of the embodiments of this application, a bar code display method is provided. In the embodiments of this application, a programmable bar code is a bar code that can be obtained through programming. The bar code may be a graphical identifier in which a plurality of black bars and blanks having different widths are arranged according to specific encoding rules to express a group of information. For example, the bar code may be specifically a bar shaped code or a QR code.

Figure 1:
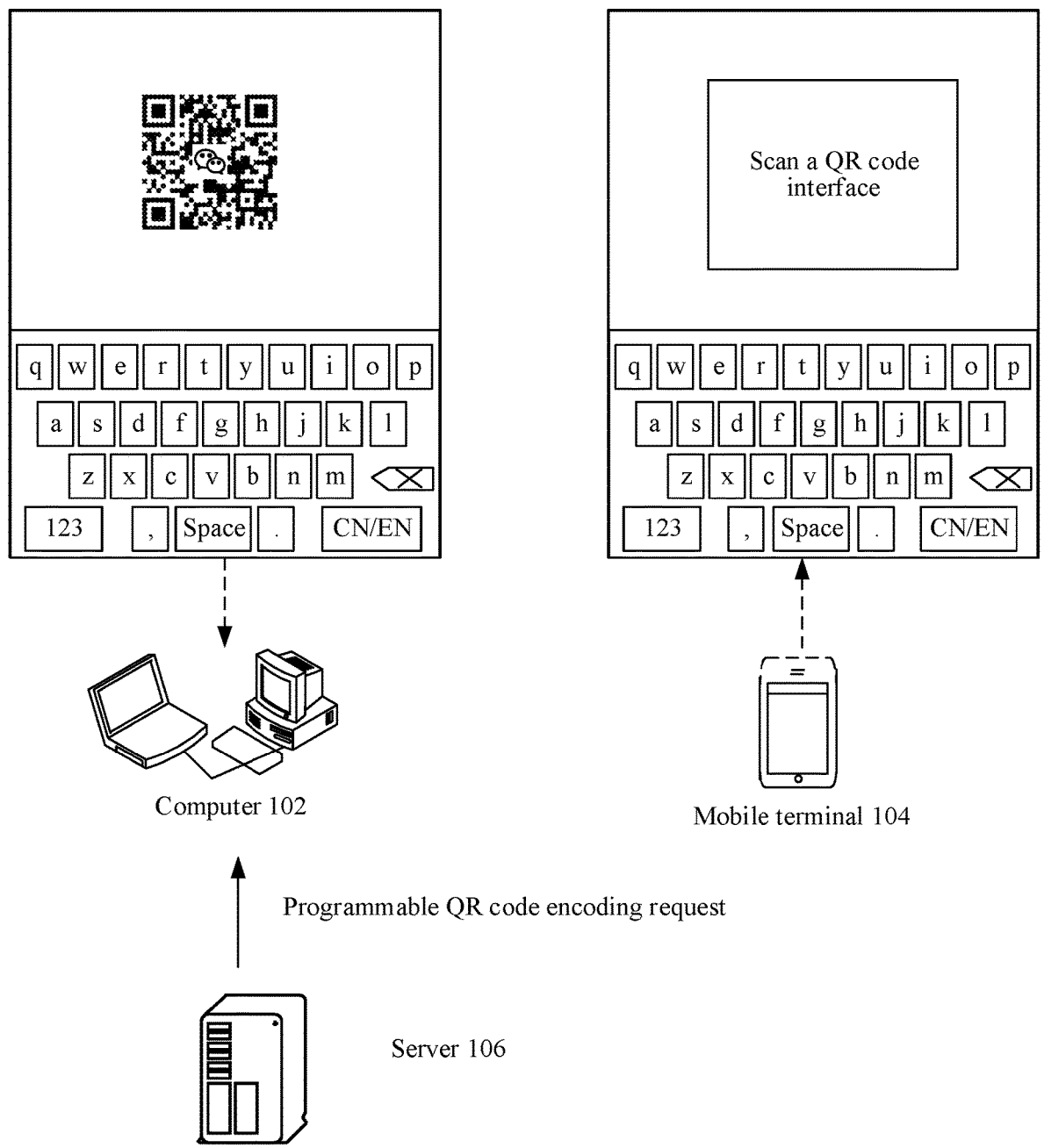
FIG. 1 is a schematic diagram of an exemplary environment of an optional bar code display method according to an embodiment of this application.

Optionally, in an optional implementation, the foregoing bar code display method may be applied to, but not limited to, an exemplary environment shown in FIG. 1. As shown in FIG. 1, description is made by using a QR code. A terminal includes a computer 102 and a mobile terminal 104. The computer 102 may obtain a programmable QR code encoding request through a server 106 or a network. After receiving the request, the computer 102 encodes target code in response to the request and obtains a target programmable QR code carrying the target code, the target code being used for executing a target logical function, and then the computer 102 displays the target programmable QR code on a display interface. The mobile terminal 104 may scan the target programmable QR code through its own application, to obtain the target code and run the target code, to implement a target logical function corresponding to the target code, and display, on the mobile terminal 104, a result obtained by executing the target logical function.

The programmable bar code in the embodiments of this application is such a technology that by using the existing bar code encoding technology to encode target code. The target code may be binary code (also referred to as byte code in this disclosure) compiled from source code using a non-proprietary or customized, proprietary programming language and the corresponding compiler. The target code may also be source code using a non-proprietary or customized, proprietary programming language. The target code is encoded into a programmable bar code to obtain a corresponding programmable bar code. During bar code scanning, the target code is decoded and retrieved using a corresponding programmable bar code decoding program. Then the target code is run, for example, in the target operating system directly or through a built-in dedicated virtual machine to implement the corresponding logical function. Furthermore, in some embodiments, the target operating system and the dedicated virtual machine may be proprietary and is customized to execute the target code. As such, the target code may not be able to run in other environment. It is to be understood that information carried or embedded in such a programmable bar code is the target code which is executable binary code or source code and is different from static text information carried in a conventional bar code. Because the target code implements logical judgments and algorithms, the target code can implement corresponding logical functions, and expand the range of information carried in a bar code, so that the programmable bar code is applicable to more complex scenarios and has more abundant applications. Therefore, the embodiments of this application resolve the technical problem in the related art that information carried in a bar code is relatively simple.

The foregoing terminal to which the embodiments of this application are applied may be a tablet computer, a notebook computer, a desktop PC, or the like, or a mobile terminal (mobile phone). The foregoing network may include, but is not limited to a wireless network or a wired network. The wireless network includes: Bluetooth, Wi-Fi, and another network implementing wireless communication. The foregoing wired network may include, but is not limited to, a wide area network, a metropolitan area network, and a local area network. The foregoing server may be used for data calculation and storage, such as a notebook computer or a PC.

Figure 2:
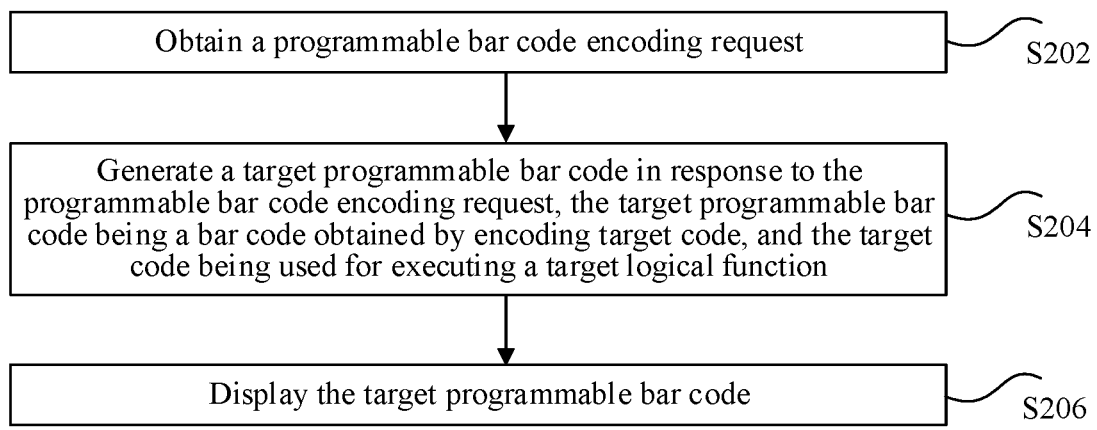
FIG. 2 is a schematic flowchart of an optional bar code display method according to an embodiment of this application.

According to an aspect of the embodiments of this application, a bar code display method is provided. As shown in FIG. 2, the foregoing bar code display method may include the following steps:

S202: Obtain a programmable bar code encoding request.

S204: Generate a target programmable bar code in response to the programmable bar code encoding request, the target programmable bar code being a bar code obtained by encoding target code, and the target code being used for executing a target logical function.

S206: Display the target programmable bar code.

The foregoing programmable bar code may be applied to location positioning. For example, the target code may carry information for calling and engaging corresponding positioning hardware. In one embodiment, the programmable bar code carrying the target code is generated and printed on a ticket. When a device scan the programmable bar code, the target code may be retrieved from the programmable bar code. Upon executing the target code by the device, the positioning hardware within the device is identified, called and engaged, to obtain the position of the device. As another example, the foregoing programmable bar code may be applied to a ticket (such as a train ticket, a movie ticket, or an attraction ticket). For example, personal information on a ticket is carried in target code, and a programmable bar code carrying the target code is printed on the ticket, so that content carried in the programmable bar code may be target code for retrieving personal information when executed on the device. The foregoing description is only two examples and this embodiment does not impose any limitation on this.

A programmable bar code is obtained by encoding the target code, that is, information carried in the programmable bar code is the target code. Because the target code has logical judgments and algorithms, the target code can implement various logical functions, and greatly expand the range of information carried in a bar code, so that the programmable bar code is applicable to more complex scenarios and has more abundant applications. Therefore, this embodiment of this application resolves the technical problem in the related art that information carried in a bar code is static and relatively simple.

The foregoing process of generating the target programmable bar code in response to the programmable bar code encoding request may include, but is not limited to, the following method: obtaining target code; and using a target bar code encoding algorithm to obtain the target programmable bar code with a character string of the target code as the input parameter.

The target code may be obtained by using, but not limited to, the following method: a corresponding target parameter value is obtained according to a parameter input operation, for example, an identification card number of a ticket purchaser entered by a ticket seller; the target parameter may be encrypted, and then the encrypted target parameter is encoded to obtain the target code. For example, the foregoing identification card number is encrypted and then encoded to obtain the corresponding target code to protect the identification card number. Furthermore, a logical function of a read permission to an identification card number may be set in the target code, or a validity period for running the code may be set in the target code, so only entities with right permission may run the target code to retrieve the identification information during the validity period.

The target code in this embodiment of this application is used for executing at least one of the following target logical functions:

(1) A target logical function, which may be used for allowing a target having a read permission to run the target code, where the target may be an account, a device or a virtual machine.

(2) A target logical function, which may be used for allowing the target code to be run within a validity period.

When the target code is used for executing the foregoing two target logical functions, the programmable bar code encoding request may be obtained by using, but not limited to the following method: generating, by the terminal in response to receiving a request for generating a target programmable bar code corresponding to predetermined information (for example, identification card information) of a ticket, a programmable bar code encoding request carrying the predetermined information according to the request. The generating a target programmable bar code in response to the programmable bar code encoding request may be implemented by using, but not limited to the following method: encoding, by the terminal, the target code including the predetermined information to obtain the target programmable bar code according to the foregoing programmable bar code encoding request.

(3) A target logical function, which may be used for calling target hardware to execute a target operation.

When the target code is used for executing the foregoing target logical function, the programmable bar code encoding request may be obtained by using, but not limited to the following method: receiving, by the terminal, a target request that is used for requesting to generate the target programmable bar code for target location positioning; and generating, by the terminal in response to the programmable bar code encoding request, the programmable bar code. The programmable bar code encoding request carrying an identifier of a target positioning hardware (for example, a GPS) in a target device. The target device may be any device or terminal which scans the generated programmable bar code to run the target code. The generating a target programmable bar code in response to the programmable bar code encoding request includes: encoding, by the terminal, target code used for identifying and configuring target hardware in the target device to obtain a target programmable bar code, so that after the bar code is scanned, the corresponding target code may be run to call the target hardware (for example, the GPS) to position the target location.

The foregoing target programmable bar code may be directly displayed on the terminal, or may be printed on a target medium. The foregoing target medium includes, but is not limited to the following: paper, cloth, plastic, glass, or the like.

In an optional solution, in this embodiment, the foregoing process of generating a target programmable bar code in response to the programmable bar code encoding request may be implemented by using, but not limited to the following method: obtaining target code; and executing a target bar code encoding algorithm to obtain the target programmable bar code using a character string of the target code as an input parameter.

Figure 3:
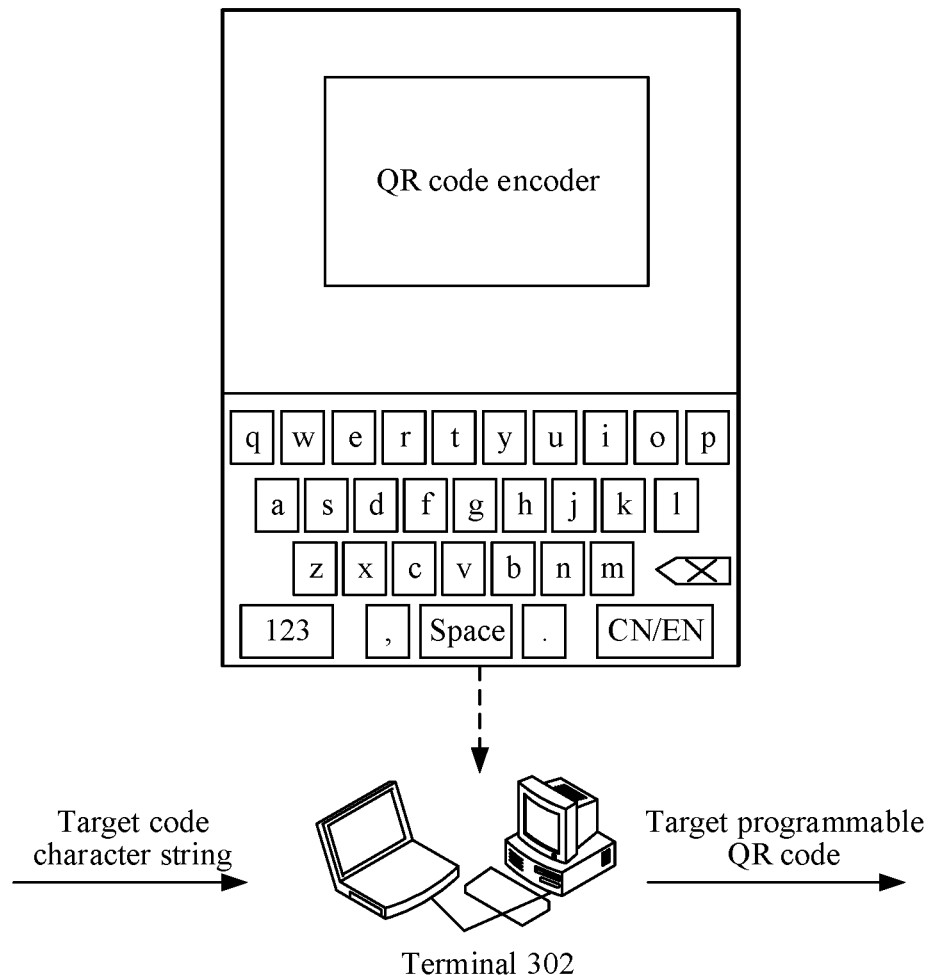
FIG. 3 is a schematic diagram of encoding an optional QR code according to an embodiment of this application.

Description is specifically made with reference to the following examples where a QR code is used. As shown in FIG. 3, it is assumed that the target code has been generated, for example, through compiling of source code, and the character string of the target code is encoded by using a QR code encoder on the terminal 302, to obtain a corresponding target programmable QR code. A target QR code encoding algorithm may be installed in the foregoing QR code encoder, and the target QR code encoding algorithm may be an existing QR code encoding algorithm. In one embodiment, the target code after the compilation may be in binary code format. Optionally, the target code may be encrypted first before the encoding.

As compared with the related art, in this embodiment of this application, the character string of the target code is used as the input parameter of the target bar code encoding algorithm. Text information is no longer used as the input parameter of the bar code encoding algorithm, and instead, the character string of the target code is used as the input parameter of the bar code encoding algorithm. Therefore, the foregoing programmable bar code carries the target code, and the bar code does not carry plain text information but a piece of code, to avoid information leakage.

In an optional solution, in this embodiment, the foregoing target code is obtained by using, but not limited to the following method: obtaining a target parameter value in response to a parameter input operation; and generating the target code according to the target parameter value, a value of a parameter in the target code being the target parameter value.

Figure 4:
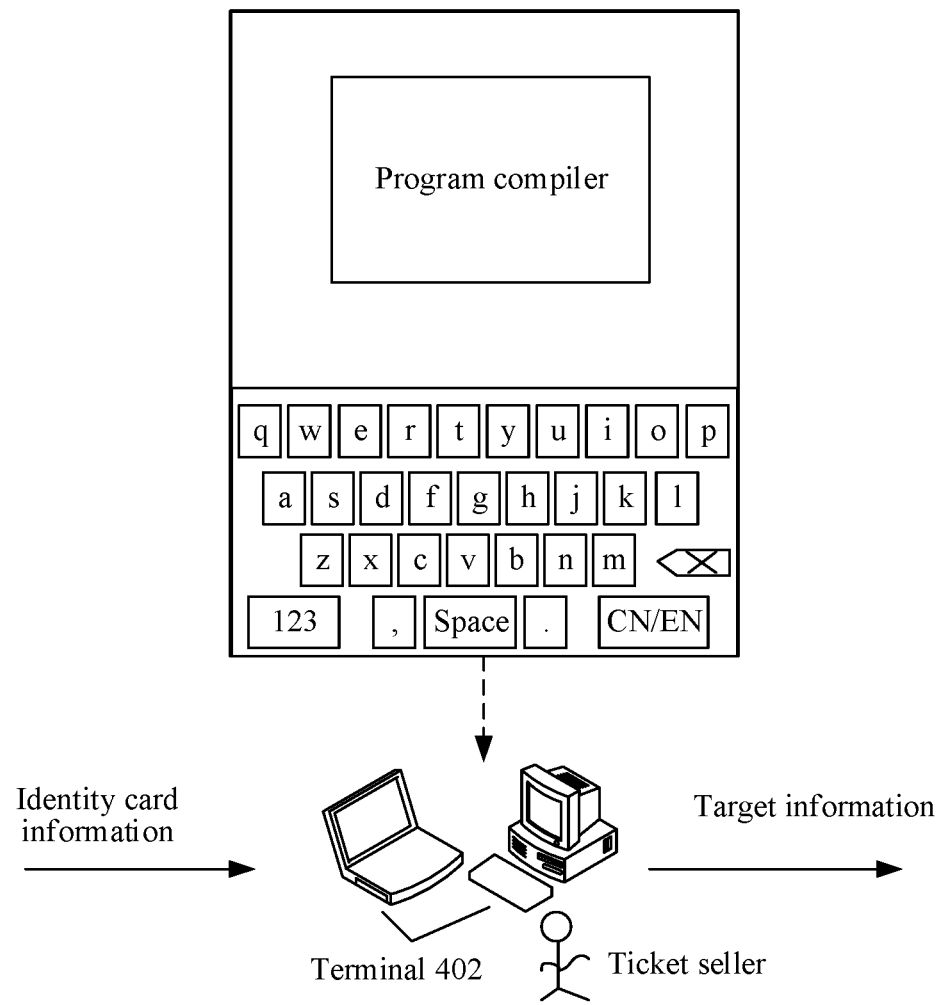
FIG. 4 is a schematic diagram of obtaining optional target code according to an embodiment of this application.

Description is specifically made with reference to the following example. As shown in FIG. 4, a ticket seller enters identification information of a ticket purchaser on a terminal 402, and a control program editor sets a target parameter value of a target code model stored on the terminal to the identification information (for example, an identification card number) to generate corresponding target code. To reduce complexity of a QR code, the foregoing program editor may be, but is not limited to, an integrated development environment (IDE for short). The foregoing target code model may be pre-compiled, and the ticket seller only needs to enter the target parameter value. The logical function that the target code model may implement is not limited. The logical function may be a permission of running the target code, or a validity period the target code may be run, or the logical function may identify and configure a hardware on the target device.

Through the foregoing embodiment, the target parameter value may be obtained according to a parameter input operation (for example, identification information is inputted) received by the terminal; and then, the target parameter is used as an input to the target code model to generate the target code, so that a programmable bar code may be conveniently generated without a special requirement on the compiling capability of a user who generates the bar code.

In an optional solution, the foregoing target code in this embodiment is used for executing at least one of the following target logical functions:

(1) A first target logical function, used for allowing an account, a device, or a virtual machine with a read permission to run the target code. A bar code read permission may be implemented to improve bar code security.

For example, the foregoing embodiment may be applied to a ticket. In this case, description is made by using a train ticket as an example. A read permission of a target programmable QR code is carried in target code of the QR code displayed on the train ticket, so that when the QR code is scanned, even if the target code is decoded, the target code may not necessarily be run; that is, only a device that has a read permission and that is in the hands of a ticket inspector who has a legitimate account can run the target code to read the identification card information in the target programmable QR code, to determine whether the passenger is the right person.

(2) A second target logical function, used for limiting the target code to be run within a validity period. The validity period during which a bar code may be read is limited by using the foregoing logical function, to improve bar code security.

For example, the foregoing embodiment may be further applied to a ticket. In this case, description is made by using a scenic spot as an example. Target code of a QR code displayed on the scenic spot ticket carries a validity period of a target programmable QR code. For example, the ticket is valid on Mar. 22, 2018, so that when scanning the QR code, even if the target code is decoded, the target code may not necessarily be run. Only on Mar. 22, 2018, the target code can be successfully run.

(3) A third target logical function, used for calling target hardware to execute a target operation. Through the foregoing target logical function, any hardware that is expected to be called may be identified and called by reading the bar code, so that the programmable bar code can complete more complex logical functions by calling and engaging other hardware, for example, a GPS hardware for positioning the device.

In an optional solution, in this embodiment, the programmable bar code encoding request is obtained by using, but not limited to the following method: receiving, by a terminal, a target request that is used for generating a target programmable bar code corresponding to predetermined information (for example, the foregoing identification card information of a target ticket), and generating, by the terminal in response to the request, a programmable bar code encoding request carrying the predetermined information. The generating a target programmable bar code in response to the programmable bar code encoding request may be implemented by using, but not limited to the following method: encoding, by the terminal, the target code to obtain the target programmable bar code, a parameter of the target code including the predetermined information.

For example, the foregoing embodiment may be applied to a ticket (such as a train ticket, a movie ticket, or an attraction ticket). Description is made by using a train ticket as an example. Specific description is made with reference to the following example, as shown in FIG. 5. A tourist A needs to buy a train ticket to the place B, and the ticket may be bought online or manually through a counter. In this embodiment, description is made by using an example in which a ticket is bought manually through a counter. After getting information such as A's identification card or the like, a ticket seller C enters the identification number information of A in a terminal 502 to trigger the terminal to generate a programmable QR code encoding request, and add the identification card number information of A to an request. In response to the request, the terminal 502 adds the identification card number information of A to target code, then a terminal 504 encodes the target code to obtain a target programmable QR code, and then the target programmable QR code is printed on the train ticket. At last, A obtains the train ticket printed with the target programmable QR code. The operations executed by the terminal 502 and the terminal 504 may be executed on the same terminal, or two different terminals in communication with each other.

In an optional solution, in this embodiment, the target code may be further used for executing the following target logical function: a first target logical function, used for allowing an account having a read permission to run the target code, or allowing a device having a read permission to run the target code, or allowing a virtual machine having a read permission to run the target code. For example, the foregoing target code may include a permission to read a target programmable bar code, that is, only an account, a device, and the like having the foregoing permission can read the foregoing target programmable bar code, such as the QR code on the train ticket. Therefore, even if the target code is decoded, only a device that has a read permission and that is in the hands of a ticket inspector who has a legitimate account can run the target code to read the identification card information in the target programmable QR code, to determine whether the passenger is the right person.

In an optional solution, in this embodiment, the programmable bar code encoding request is obtained by using, but not limited to the following method: receiving, by a terminal, a target request that is used for generating a target programmable bar code which may be used to identify and configure a target hardware, and generating, by the terminal in response to the request, a programmable bar code encoding request carrying an identifier of a target hardware (for example, the foregoing GPS) of the target device. Optionally, in this embodiment, the generating a target programmable bar code in response to the programmable bar code encoding request includes: encoding, by the terminal, the target code to obtain the target programmable bar code, the target code including a parameter used for identifying the target hardware in the terminal, and the target logical function being used for calling the target hardware to position the target device location.

For example, the foregoing embodiment may be applied to location positioning. Description is made by using an example in which a Global Positioning System (GPS for short) in the target device is called to position the target device. When a terminal receives a request that a target programmable QR code for positioning the target location needs to be generated, a programmable QR code encoding request including a GPS identifier is generated, and the terminal is triggered to add the identifier to the target code. The target code is then encoded to obtain a target programmable QR code. Subsequently, the target code may be retrieved by scanning the target programmable QR code using the target device, and the target location may be positioned by running the target code which in turn calls the GPS hardware. In one embodiment, the target code embedded in the QR code printed on the ticket may further carry a designated location. In this case, once the target location is identified by executing the target code, the target location information may be further used to compare with the designated location carried in the QR code to determine the validity of the ticket.

In an optional solution, in this embodiment, the displaying the target programmable bar code includes at least one of the following: displaying, by the terminal, the target programmable bar code, and printing, by the terminal, the target programmable bar code on a target medium. The displaying the target programmable bar code may be to display the target programmable bar code on the terminal directly, or print the target programmable bar code on a target medium. The foregoing target medium includes but is not limited to the following: paper, cloth, plastic, glass, or the like.

Optionally, the foregoing embodiment may be further applied to cryptography. Previous cryptographic encryption results are all static characters. The encryption results may be dynamically changed at any time by using similar principles of the programmable QR codes as described in this disclosure, and a permission of a reader may be authenticated, providing a new solution for information security.

Optionally, the target code may be optimized to be as concise as possible. In one embodiment, custom language rules for encoding target code may be, but are not limited to the following:

1. A variable definition may be similar to js (JavaScript) and there is no need to declare variable types; and all variables start with "v_".

2. When an object is instantiated, a "new" keyword is not needed and (param, param . . . ) is added behind a class name directly. For example, v_obj=Object ( ).

3. Each line of code ends with ";"; and there is no need to change line.

4. Four arithmetic operations (+−*/) may be used for classes of which operation content is essentially numeric. For example, for a Date type, a time difference may be calculated by directly using "−" operation.

For example, sample code may be as shown in FIG. 6. A validity period is set for the code, and a time difference between a current time and 2012-8-12 (only for the exemplary purpose) is calculated. If the time difference is within 1 minute, the target code may be run and "valid" is prompted; otherwise, "invalid" is prompted.

According to another aspect of the embodiments of this application, a bar code scanning method is further provided, and the method may be applied to the environment shown in FIG. 1. The bar code scanning method, as shown in FIG. 7, may include:

S702: Scan a target programmable bar code to obtain target code, the target programmable bar code being a bar code obtained by encoding the target code, and the target code being used for executing a target logical function.

S704: Run the target code to execute the target logical function.

S706: Display a result obtained by executing the target logical function.

The foregoing programmable bar code may be applied to a ticket (such as a train ticket, a movie ticket, or an attraction ticket). For example, personal information is carried in target code, and a bar code carrying the target code is printed on the ticket. Upon scanning, the target code may be decoded from the bar code and executed to retrieve the personal information. The programmable bar code may be further applied to location positioning. For example, the target code carries information such as a hardware identifier for calling corresponding positioning hardware, and a bar code carrying the target code is printed on a ticket, so that the positioning hardware may be called by scanning the bar code to position the device location. The foregoing description is only two examples and this embodiment does not impose any limitation on this.

A programmable bar code is obtained by encoding target code, that is, information carried in the programmable bar code is the target code. Because the target code implements logical judgments and algorithms, the target code may be run to implement various logical functions, and greatly expand a range of information carried in a bar code, so that the programmable bar code is applicable to more complex scenarios and has more abundant applications. Therefore, this embodiment of this application resolves the problem in the related art that information carried in a bar code is static and relatively simple.

The scanning a target programmable bar code to obtain target code may be implemented by using, but not limited to the following method: inputting a scanned target programmable bar code into a decoding algorithm corresponding to the encoding algorithm, to decode the target programmable bar code, and if the target code is encrypted in an encoding process, performing corresponding decryption after decoding to obtain the target code.

For example, the foregoing target code is used for executing at least one of the following target logical functions:

(1) A target logical function, which may be used for allowing an account having a read permission to run the target code, or allowing a device having a read permission to run the target code, or allowing a virtual machine having a read permission to run the target code.

For example, in a case that the target code is used for executing the foregoing target logical function, running the target code to execute the target logical function is implemented by using, but not limited to the following method: running the target code, and determining whether a target account that scans the target programmable bar code has a read permission; and displaying a result obtained by executing the target logical function includes: executing the target logical function corresponding to the foregoing target code when it is determined that the target account has a read permission, and displaying a result obtained by executing the target logical function.

(2) A target logical function, which may be used for allowing the target code to be run within a validity period.

For example, in a case that the target code is used for executing the foregoing target logical function, running the target code to execute the target logical function may be implemented by using, but not limited to the following method: running the target code, and determining whether a target code is within the validity period; and the result obtained by executing the target logical function may be displayed by using, but not limited to the following method: displaying the result obtained by executing the target logical function only after it is determined that the target code is within the validity period.

(3) A target logical function, which may be used for calling target hardware to execute a target operation.

For example, in a case that the target code is used for executing the foregoing target logical function, the running the target code to execute the target logical function may be implemented by using, but not limited to the following method: obtaining an identifier of the target hardware in a target device; and calling the target hardware indicated by the identifier to execute the target operation.

For another example, the scanning a target programmable bar code to obtain target code may be implemented by using, but not limited to the following method: scanning, by the terminal on a target medium, a target programmable bar code carrying a parameter that identifies target hardware used for positioning a target location in the terminal, to obtain the target code. Optionally, the running the target code to execute the target logical function may be implemented by using, but not limited to the following method: obtaining, by the terminal, the identifier of the target hardware according to the parameter that identifies the target hardware used for positioning the target location in the terminal, and calling, by the terminal, the target hardware indicated by the identifier to position the target location, and then displaying the positioned target location.

In an optional solution, in this embodiment, the scanning the target programmable bar code to obtain target code may be implemented by using, but not limited to the following method: decoding a scanned target programmable bar code by using a decoding algorithm corresponding to the encoding algorithm, to obtain the target code. As compared with the related art, in this embodiment of this application, text information is not obtained after decoding directly, but corresponding target code is obtained, so that corresponding information of the target code cannot be obtained if the target code is not permitted to run, for example, due to no read permission, or the target environment not supporting the target code, or not within the validity period, to avoid information leakage.

Figure 8:
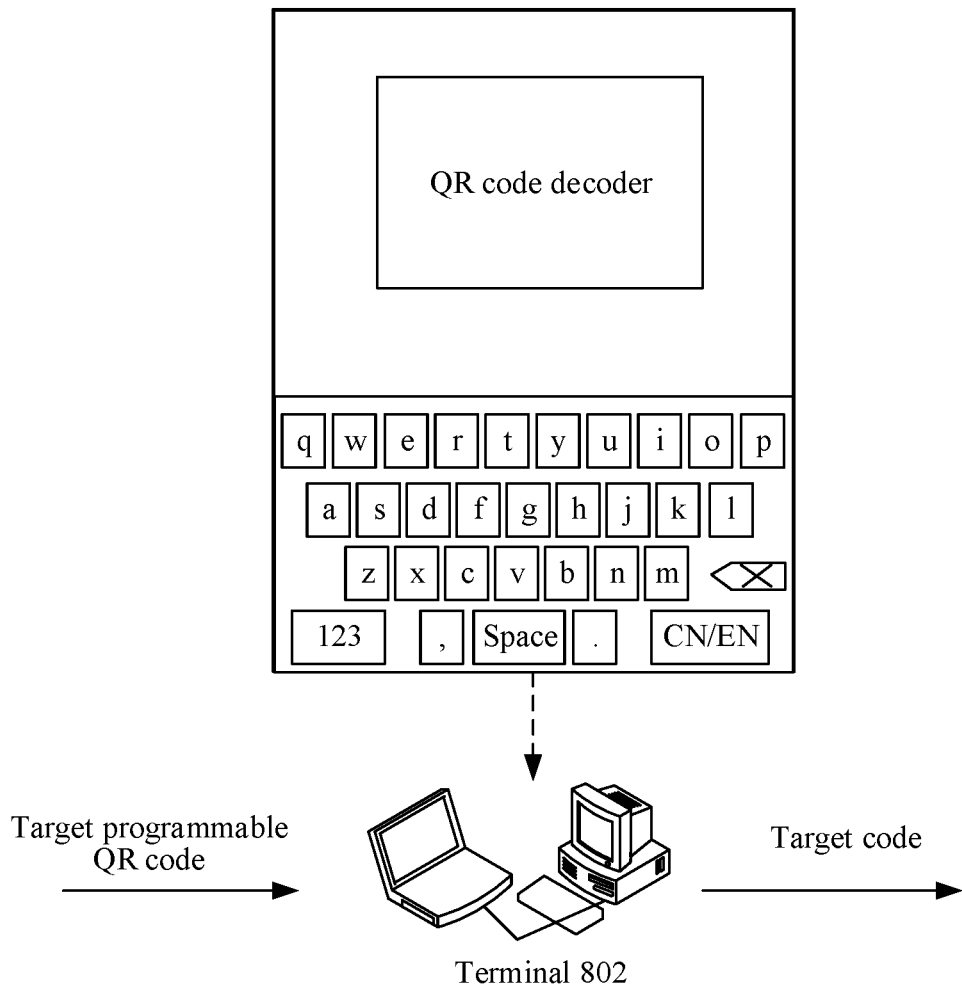
FIG. 8 is a schematic diagram of decoding an optional QR code according to an embodiment of this application.

Description is specifically made with reference to the following example. As shown in FIG. 8, the foregoing target programmable QR code is decoded by using a QR code decoder on a terminal 802, to obtain the corresponding target code. A target QR code decoding algorithm may be installed in the foregoing QR code decoder, and the target QR code decoding algorithm may be an existing target QR code decoding algorithm.

In an optional solution, the foregoing target code in this embodiment is used for executing at least one of the following target logical functions:

(1) A first target logical function, used for allowing an account having a read permission to run the target code, or allowing a device having a read permission to run the target code, or allowing a virtual machine having a read permission to run the target code. A bar code read permission may be limited by using the foregoing logical function, to improve bar code security.

(2) A second target logical function, used for allowing the target code to be run within a validity period. The validity period during which a bar code may be read and the target code may be run is limited by using the foregoing logical function, to improve bar code security.

(3) A third target logical function, used for calling target hardware to execute a target operation. Through the foregoing logical functions, any hardware that is expected to be called may be called by reading the bar code, so that the programmable bar code can complete more complex logical functions.

In an optional solution, in this embodiment, when the target code is used for executing the foregoing first target logical function, running the target code to execute the target logical function may be implemented by using, but not limited to the following method: running the target code, and determining whether the target account has a read permission, the target account being used for scanning the target programmable bar code; and displaying a result obtained by executing the target logical function may be implemented by using, but not limited to the following method: displaying the result obtained by executing the target logical function when it is determined that the target account has a read permission. Through the foregoing embodiment, a bar code read permission mechanism is implemented, and security of a bar code is improved.

For example, the foregoing embodiment may be applied to a ticket (such as a train ticket, a movie ticket, or an attraction ticket). Description is made still by using a train ticket as an example. Description is specifically made with reference to the following example, as shown in FIG. 5. When a passenger A's train ticket is checked, the ticket inspector uses the device in the hands to scan the QR code on the train ticket, to obtain the target code embedded in the QR code. Because the device in the hands of the ticket inspector has a permission to read the foregoing QR code, A's identification card information may be obtained by successfully running the target code. On the other hand, unauthorized device or person may not be able to read the bar code.

In an optional solution, in this embodiment, in a case that the target code is used for executing the foregoing first target logical function, running the target code to execute the target logical function may be implemented by using, but not limited to the following method: running the target code, and determining whether a target programmable bar code is within the validity period; and the result obtained by executing the target logical function may be displayed by using, but not limited to the following method: displaying the result obtained by executing the target logical function after it is determined that the target programmable bar code is within the validity period. Through the foregoing embodiment, the bar code is valid within a validity period, and bar code security and flexibility is improved.

In an optional solution, in this embodiment, in a case that the target code is used for executing the foregoing first target logical function, the running the target code to execute the target logical function may be implemented by using, but not limited to the following method: obtaining an identifier of the target hardware in a target device; and calling the target hardware indicated by the identifier to execute the target operation. Through the foregoing embodiment, the target hardware may be called and engaged through the bar code, so that the bar code is applicable to more complex scenarios and has more abundant applications.

For example, the foregoing embodiment may be applied to location positioning. When the foregoing embodiment is applied to location positioning, description is made still by using an example in which the GPS in the terminal is called for location positioning. The terminal scans the target programmable QR code, to obtain the target code including the GPS identifier. The terminal runs the target code, calls and configures the GPS corresponding to the identifier to obtain the position information of the target location (that is, the current position), and then displays the information on the terminal. It is to be further understood, the target hardware may be any kind of hardware devices or components, or the like in the terminal (target device).

In an optional solution, in this embodiment, the scanning a target programmable bar code to obtain target code may be implemented by using, but not limited to the following method: scanning, by the terminal, a target programmable bar code on a target medium to obtain the target code, the target programmable bar code carrying a parameter for identifying the target hardware in the terminal and being used for positioning the target location. Optionally, in this embodiment, the running the target code to execute the target logical function may be implemented by using, but not limited to the following method: obtaining, by the terminal, the identifier of the target hardware according to the foregoing parameter; and calling, by the terminal, the target hardware indicated by the identifier to position the target location. Optionally, in this embodiment, the result obtained by executing the target logical function may be displayed by using, but not limited to the following method: displaying, by the terminal, the target location.

Optionally, the foregoing embodiment may be further applied to cryptography. Previous cryptographic encryption results are all static characters. The encryption results may be dynamically changed at any time by using similarity principles of programmable QR codes, and a permission of a reader may be authenticated, providing a new solution for information security.

In an optional solution, the running the target code to execute the target logical function may be implemented by using, but not limited to the following method: calling a predetermined virtual machine, the predetermined virtual machine being configured to run the target code; and running the target code on the predetermined virtual machine, to execute the target logical function. In this embodiment, the foregoing target code may be directly run on a virtual machine, or the virtual machine may be called through an application on the terminal, to run the target code on the virtual machine. The virtual machine may be customized and proprietary, or non-proprietary.

The foregoing target code may be an executable program that runs directly on a virtual machine, or may be code written through the integrated software development environment (IDE) to reduce the QR code capacity and complexity requirement, the tool for writing the code is not limited to the IDE.

When written through the integrated software development environment IDE, the target code needs to be converted into general front-end code (for example, js code) by a virtual machine in a decoding process.

To facilitate understanding of the foregoing embodiments, in this embodiment, description is made still by using an example in which the bar code is a QR code with reference to encoding and decoding of the programmable QR code.

Figure 9:
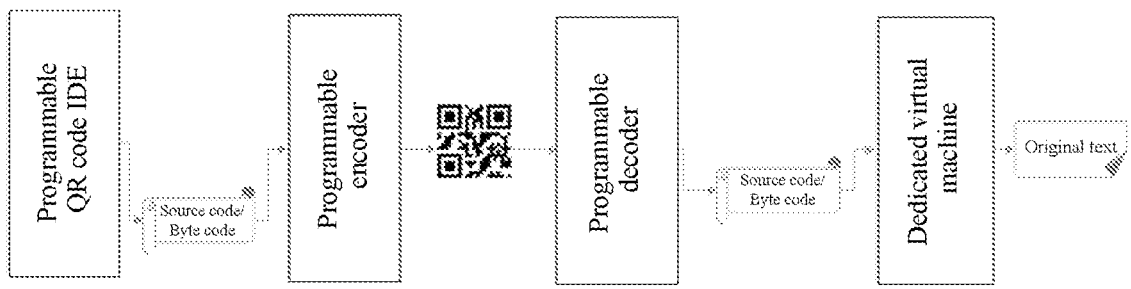
FIG. 9 is a schematic diagram of encoding and decoding an optional programmable QR code according to an embodiment of this application.

As shown in FIG. 9, in this embodiment of this application, the target code carrying original text is written through the IDE first to obtain the source code or the binary code (also referred to as byte code in this disclosure) as shown in FIG. 6. The programmable QR code is then obtained by encoding the target code by using a QR code encoder. The target code is then retrieved by decoding the programmable QR code by using a QR code decoder. At last, the original text is obtained by running the target code through the virtual machine. Specifically, an exemplary encoding and decoding process of a programmable QR code is as follows:

During encoding, the code including the original text is written through the IDE to generate the source code or the binary code. Generated character strings are used as parameters, and a QR code graphic is generated by using the existing QR code encoding algorithm.

During decoding and reading, information content is restored through image recognition and a decoding algorithm, that is, the source code or the binary code is retrieved by using the existing QR code decoding algorithm. The original text is obtained by executing the retrieved code on a dedicated virtual machine.

Detailed description of encoding and decoding of a programmable QR code is made below by using an example in which a QR code validity period is set.

(1) Target code is written through the integrated development environment IDE, the code shown in FIG. 6 being used as an example of the target code.

(2) The QR code is generated by encoding, that is, character strings of the target code in step (1) may be converted into a QR code by using the existing QR code encoding technologies, as shown in FIG. 10.

(3) The QR code is decoded, the virtual machine software development kit (SDK) may be integrated on a mobile terminal (android/ios) platform, and the code character strings are restored (that is, the target code) after scanning. The dedicated virtual machine is called and the target code is converted into general js code. For example, the target code shown in FIG. 6 is converted into the general js code shown in FIG. 11. Alternatively, the target code may be executable binary code that may be run directly in the target environment without conversion.

(4) The target code is run, and the code may be executed by using an executor method of the virtual machine, to complete logic in the target code. The foregoing virtual machine may further support conversion between multiple programming languages to make the converted target code suitable to be run in the target environment.

Content of the programmable QR code in this embodiment of this application is no longer static text information, but binary code generated by a programming language and the corresponding compiler, or the source code itself. During bar code scanning from a target device, the content obtained by using the existing QR code decoding technologies is not text but target code which may be binary or source code. Information that a QR code expects to convey can be obtained only by running the retrieved target code in a predetermined target environment which is configured to support the target code. In this way, as compared with the previous QR code technologies, a read permission and a validity period may be implemented in the target code, and even hardware in the target device may be called and configured, to complete other more complex logic. Therefore, the programmable QR code of this embodiment of this application greatly expands capability of a QR code, so that a static QR code has its own programming logic, and the QR code is applicable to more complex scenarios and has more abundant applications. As compared with the existing QR code solutions, the programmable QR code is more secure, more expandable, and has more prospects for use. Furthermore, the quantity of code bytes may be compressed by customizing a special QR code programming language to improve the execution efficiency of encoding and decoding.

Similar to ideas of dynamic QR codes, there will be similar applications in cryptography, and this helps improve current encryption security.

Optionally, in this embodiment, the foregoing terminal may include, but is not limited to, at least one of the following: a mobile phone, a tablet computer or the like.

For ease of description, the foregoing method embodiments are stated as a series of action combinations. However, a person skilled in the art needs to learn that this application is not limited to the described sequence of the actions because according to this application, some steps may use another sequence or may be simultaneously performed. In addition, it is to be understood by a person skilled in the art that the embodiments described in this specification are all preferred embodiments, and the actions and modules in the embodiments are not mandatory for this application.

Through the descriptions of the foregoing implementations, a person skilled in the art may clearly understand that the method according to the foregoing embodiments may be implemented by means of software and a necessary general hardware platform, and certainly, may also be implemented by hardware, but in many cases, the former manner is a better implementation. Based on such an understanding, the technical solutions of this application essentially, or the part contributing to the related art may be implemented in a form of a software product. The computer software product is stored in a storage medium (for example, a ROM/RAM, a magnetic disk, or an optical disc), and includes several instructions for instructing a terminal device (which may be a mobile phone, a computer, a server, a network device, or the like) to perform the methods according to the embodiments of this application.

According to another aspect of the embodiments of this application, a bar code display apparatus is further provided. As shown in FIG. 12, the apparatus includes:

an obtaining unit 1202, configured to obtain a programmable bar code encoding request;

a generating unit 1204, configured to generate a target programmable bar code in response to the programmable bar code encoding request, the target programmable bar code being a bar code obtained by encoding the target code, and the target code being used for executing a target logical function; and a display unit 1206, configured to display the target programmable bar code.

The foregoing programmable bar code may be applied to a ticket (such as a train ticket, a movie ticket, or an attraction ticket). For example, personal information on a ticket is carried in target code, and then a bar code carrying the target code is printed on the ticket, so that content carried in the bar code may be the target code comprising the personal information. The programmable bar code may be further applied to location positioning. For example, the target code carries information for calling corresponding positioning hardware, and then a bar code carrying the target code is printed on a ticket, so that the positioning hardware may be called by scanning the bar code to position the location, and content carried in the bar code may be the target code comprising the information for calling the corresponding positioning hardware. The foregoing description is only two examples and this embodiment does not impose any limitation on this.

A displayed programmable bar code is obtained by encoding the target code, that is, information carried in the programmable bar code is the target code. Because the target code has logical judgments and algorithms, the target code can implement various logical functions, and greatly expand a range of information carried in a bar code, so that the programmable bar code is applicable to more complex scenarios and has more abundant applications. Therefore, this embodiment of this application resolves the technical problem in the related art that information carried in a bar code is relatively simple.

In an optional implementation solution, a second obtaining unit 704 includes:

an obtaining module, configured to obtain target code; and an execution module, configured to obtain the target programmable bar code by executing a target bar code encoding algorithm, a character string of the target code being used as an input parameter to the target bar code encoding algorithm.

Description is specifically made with reference to the following examples. As shown in FIG. 3, it is assumed that the target code has been written, the character string of the target code is encoded by using a QR code encoder on the terminal 302 to obtain a corresponding target programmable QR code. A target QR code encoding algorithm may be installed in the foregoing QR code encoder, and the target QR code encoding algorithm may be an existing QR code encoding algorithm.

As compared with the related art, in this embodiment of this application, text information is no longer used as the input parameter of the QR code encoding algorithm, and instead, the character string of the target code is used as the input parameter of the QR code encoding algorithm. Furthermore, the character string may be encrypted before the encoding. Therefore, the foregoing programmable QR code carries the target code, so that the QR code does not carry information but a piece of code, to avoid information leakage.

Optionally, the foregoing target code in this embodiment is used for executing at least one of the following target logical functions:

(1) A first target logical function, used for allowing an account having a read permission to run the target code, or allowing a device having a read permission to run the target code, or allowing a virtual machine having a read permission to run the target code. A bar code read permission may be limited by using the foregoing target logical function, to improve bar code security.

(2) A second target logical function, used for allowing the target code to be run within a validity period. The validity period during which a bar code may be read is limited by using the foregoing target logical function, to improve bar code security.

(3) A third target logical function, used for calling target hardware to execute a target operation. Through the foregoing target logical function, any hardware that is expected to be called may be called by reading the bar code, so that the programmable bar code can complete more complex functions.

Optionally, in this embodiment, the programmable bar code encoding request is obtained by using, but not limited to the following method: receiving, by a terminal, a target request that is used for generating a target programmable bar code corresponding to predetermined information (for example, the foregoing identification card information) of a target ticket, and generating, by the terminal in response to the request, a programmable bar code encoding request carrying the predetermined information. The generating a target programmable bar code in response to the programmable bar code encoding request may be implemented by using, but not limited to the following method: encoding, by the terminal, the target code to obtain the target programmable bar code, a parameter of the target code including the predetermined information.

Optionally, in this embodiment, the target code is further used for executing the following target logical function: a first target logical function, used for allowing an account having a read permission to run the target code, or allowing a device having a read permission to run the target code, or allowing a virtual machine having a read permission to run the target code. For example, the foregoing target code may include a permission to read a target programmable bar code, that is, only an account, a device, and the like having the foregoing permission can read the foregoing target programmable bar code, such as the QR code on the train ticket. Even if the target code is decoded, only a device that has a read permission and that is in the hands of a ticket inspector can run the target code to read the identification card information in the target programmable QR code, to determine whether the passenger is the right person.

Optionally, in this embodiment, the programmable bar code encoding request is obtained by using, but not limited to the following method: receiving, by a terminal, a target request that is used for requesting to generate the target programmable bar code for target location positioning, and generating, by the terminal in response to the request, a programmable bar code encoding request carrying an identifier of a target positioning hardware (for example, the foregoing GPS) in the target device. Optionally, in this embodiment, the generating a target programmable bar code in response to the programmable bar code encoding request includes: encoding, by the terminal, the target code to obtain the target programmable bar code, the target code including a parameter used for identifying the target hardware in the target device, so that after the bar code is read, the corresponding target code may be run to call and configure the target hardware (for example, the GPS) to position the target location.

Optionally, in this embodiment, the displaying the target programmable bar code includes at least one of the following: displaying, by the terminal, the target programmable bar code, and printing, by the terminal, the target programmable bar code on a target medium. The displaying the target programmable bar code may be to display the target programmable bar code on the terminal directly, or print the target programmable bar code on a target medium. The foregoing target medium includes but is not limited to the following: paper, cloth, plastic, glass, or the like.

Figure 13:
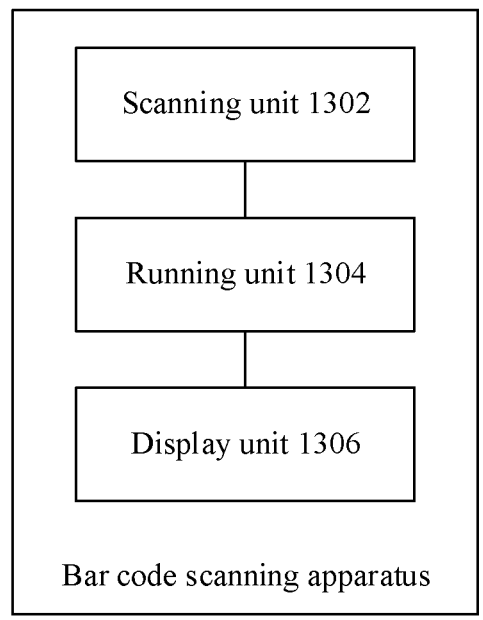
FIG. 13 is a schematic structural diagram of another optional bar code display apparatus according to an embodiment of this application.

According to another aspect of the embodiments of this application, a bar code scanning apparatus is further provided. As shown in FIG. 13, the apparatus includes:

a scanning unit 1302, configured to scan a target programmable bar code to obtain the target code, the target programmable bar code being a bar code obtained by encoding the target code, and the target code being used for executing the target logical function;

a running unit 1304, configured to run the target code to execute the target logical function; and a display unit 1306, configured to display a result obtained by executing the target logical function.

The foregoing programmable bar code may be applied to a ticket (such as a train ticket, a movie ticket, or an attraction ticket). For example, personal information on a ticket is carried in target code, and then a bar code carrying the target code is printed on the ticket. Upon scanning, the target code may be decoded from the bar code and executed to retrieve the personal information. The programmable bar code may be further applied to location positioning. For example, the target code carries information such as a hardware identifier for calling corresponding positioning hardware, and then a bar code carrying the target code is printed on a ticket, so that the positioning hardware may be called by scanning the bar code to position the device location. The foregoing description is only two examples and this embodiment does not impose any limitation on this. Furthermore, the hardware identifier may be used to identify any hardware.

A programmable bar code is obtained by encoding target code, that is, information carried in the programmable bar code is the target code. Because the target code implements logical judgments and algorithms, the target code may be run to implement various logical functions, and greatly expand a range of information carried in a bar code, so that the programmable bar code is applicable to more complex scenarios and has more abundant applications. Therefore, this embodiment of this application resolves the problem in the related art that information carried in a bar code is static and relatively simple.

In an optional solution, a scanning unit 802 includes:

a decoding module, configured to decode the scanned target programmable bar code by using a decoding algorithm corresponding to an encoding algorithm, to obtain the target code.

For example, the scanning a target programmable bar code to obtain target code may be implemented by using, but not limited to the following method: inputting a scanned target programmable bar code into a decoding algorithm corresponding to an encoding algorithm, and decoding the target programmable bar code to obtain the target code.

For example, the foregoing target code is used for executing at least one of the following target logical functions:

(1) A target logical function, which may be used for allowing an account having a read permission to run the target code, or allowing a device having a read permission to run the target code, or allowing a virtual machine having a read permission to run the target code.

(2) A target logical function, which may be used for allowing the target code to be run within a validity period.

(3) A target logical function, which may be used for calling target hardware to execute a target operation.

Optionally, in this embodiment, the scanning unit 802 is further used in, but not limited to the following method: scanning, by the terminal, a target programmable bar code on a target medium to obtain the target code, the target programmable bar code carrying a parameter for identifying the target hardware used for positioning the target location in the terminal.

Optionally, in this embodiment, a running unit 804 is further configured to, but is not limited to the following method: obtaining, by the terminal, the identifier of the target hardware according to the foregoing parameter; and calling, by the terminal, target hardware indicated by the identifier to position the target location.

Optionally, in this embodiment, a display unit 806 is further used in, but not limited to the following method: displaying, by the terminal, the target location.

In this embodiment, the foregoing target code may be directly run on a virtual machine, or the virtual machine may be called through an application on the terminal, to run the target code on the virtual machine. Optionally, the running the target code to execute the target logical function may be implemented by using, but not limited to the following method: calling a predetermined virtual machine, the predetermined virtual machine being configured to run the target code; and running the target code on the predetermined virtual machine to execute the target logical function.

The foregoing target code may be a program that runs directly on a virtual machine, or may be code written through the integrated software development environment IDE to reduce carrying capacity of the QR code, but a tool for writing the code is not limited to the IDE.

In one embodiment, the target code is developed using the integrated development environment IDE, and may need to be converted into general front-end code (for example, js code) by a virtual machine in a decoding process before the target code may be executed.

According to still another aspect of the embodiments of this application, a storage medium is further provided. The storage medium stores a computer program, the computer program being configured to perform, during running, the steps in any one of the foregoing method embodiments.

Optionally, in this embodiment, a person of ordinary skill in the art may understand that all or some of the steps of the methods in the foregoing embodiments may be implemented by a program by instructing hardware relevant to a terminal device. The program may be stored in a computer-readable storage medium, and the storage medium may include: a flash drive, a read-only memory (ROM), a random access memory (RAM), a magnetic disk, an optical disc, or the like.

Figure 14:
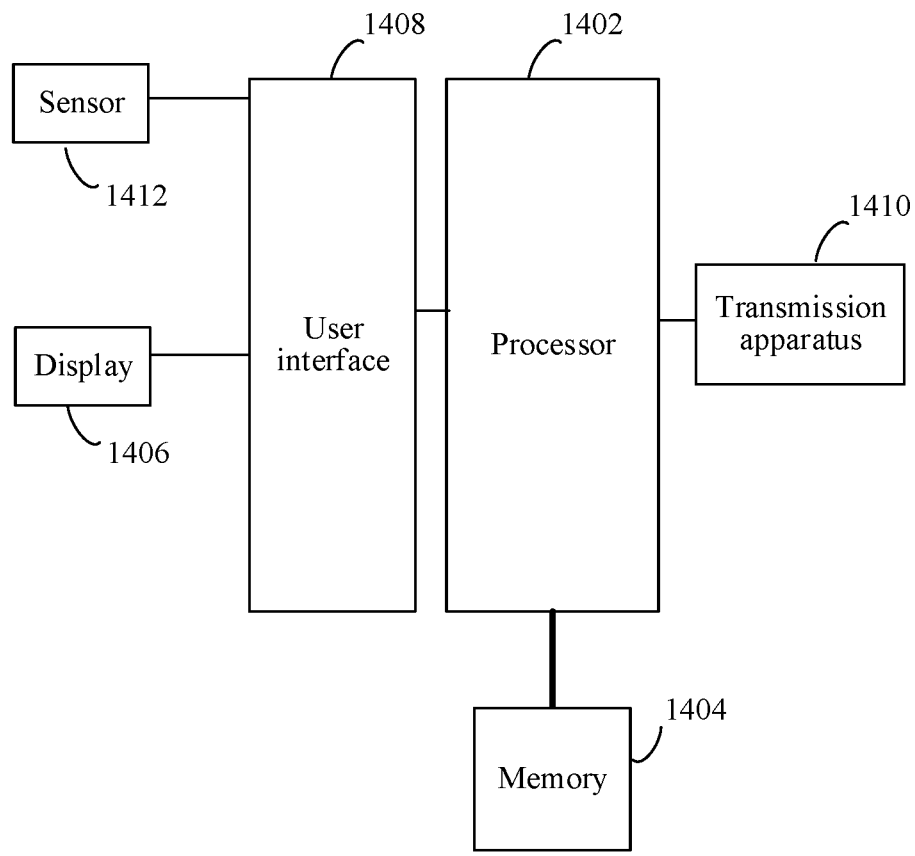
FIG. 14 is a schematic structural diagram of an optional electronic device according to an embodiment of this application.

According to still another aspect of the embodiments of this application, an electronic device configured to implement the foregoing programmable bar code display and scanning methods is further provided. As shown in FIG. 14, the electronic device includes a processor 1402 and a memory 1404. Optionally, the foregoing electronic device may further include: a display 1406, a user interface 1408, a transmission apparatus 1410, a sensor 1412, and the like. The memory stores a computer program. The processor is configured to perform the steps in any one of the foregoing method embodiments through the computer program.

Optionally, a person of ordinary skill in the art may understand that, the structure shown in FIG. 14 is only illustrative. The electronic device may alternatively be a terminal device such as a smartphone (for example, an Android mobile phone or an iOS mobile phone), a tablet computer, a palmtop computer, a mobile Internet device (MID), or a PAD. FIG. 14 does not constitute a limitation on the structure of the foregoing electronic device. For example, the electronic device may further include more or fewer components (for example, a network interface, or the like) than those shown in FIG. 14, or have configuration different from that shown in FIG. 14.

The memory 1404 may be configured to store a software program and a module, for example, a program instruction/module corresponding to the bar code generating, scanning, and display method and the bar code generating, scanning, and display apparatus in the embodiments of this application, and the processor 1402 executes various functional applications and data processing, that is, implements the bar code display and scanning method by running the software program and the module stored in the memory 1404. The memory 1404 may include a high-speed random memory, and a non-volatile memory such as one or more magnetic storage devices, a flash, or another non-volatile solid-state memory. In some embodiments, the memory 1404 may further include memories remotely disposed relative to the processor 1402, and these remote memories may be connected to a terminal through a network. An example of the foregoing network includes, but is not limited to, the Internet, an intranet, a local area network, a mobile communications network, or a combination thereof.

The foregoing transmission apparatus 1410 is configured to receive or send data through a network. Specific examples of the foregoing network may include a wired network and a wireless network. In an example, the transmission apparatus 1410 includes a network interface adapter (NIC) that may be connected to other network devices and routers through a network cable to communicate with the Internet or a local area network. In an example, the transmission apparatus 1410 is a radio frequency (RF) module, which is configured to communicate with the Internet in a wireless manner.

The foregoing sensor 1412 is configured to collect real environment data at a current real position of the terminal, the real environment data including meteorological data, geographical data, and the like. The foregoing display 1406 displays a programmable QR code. The user interface 1408 is configured to obtain an input operation instruction, such as a programmable QR code encoding request, a target request, or the like.

The sequence numbers of the foregoing embodiments of this application are merely for description purpose, and do not indicate the preference among the embodiments.

In a case that the integrated unit in the foregoing embodiments is implemented in the form of a software functional unit and sold or used as an independent product, the integrated unit may be stored in the foregoing computer-readable storage medium. Based on such understanding, the technical solutions in this application essentially, or the part contributing to the related technology, or all or some of the technical solutions may be implemented in a form of a software product. The computer software product is stored in a storage medium and includes several instructions for instructing one or more computer devices (which may be a personal computer, a server, a network device, or the like) to perform all or some of steps of the methods in the embodiments of this application.

In the foregoing embodiments of this application, the descriptions of the embodiments have their respective focuses. For a part that is not described in detail in an embodiment, reference may be made to related descriptions in other embodiments.

In the several embodiments provided in this application, it is to be understood that the disclosed client may be implemented in other manners. The described apparatus embodiment is merely an example. For example, the unit division is merely logical function division and may be another division in an actual implementation. For example, a plurality of units or components may be combined or integrated into another system, or some features may be ignored or not executed. In addition, the coupling, or direct coupling, or communication connection between the displayed or discussed components may be the indirect coupling or communication connection by means of some interfaces, units, or modules, and may be in electrical or other forms.

The units described as separate parts may or may not be physically separate, and the parts displayed as units may or may not be physical units, may be located in one position, or may be distributed on multiple network units. A part of or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The foregoing integrated unit may be implemented in the form of hardware, or may be implemented in the form of a software function unit.

The foregoing descriptions are merely exemplary implementations of this application. A person of ordinary skill in the art may make improvements and modifications without departing from the principle of this application, and all such improvements and modifications fall within the protection scope of this application.

What is claimed is:

1. A method for bar code generation performed by a device, the method comprising:
    obtaining a target code by compiling a source code, the target code being self-contained executable code comprising target computer readable instructions and comprising logic functions, wherein the target computer readable instructions are executable by a processor;
    compressing code bytes of the target code to obtain a compressed target code; and
    generating a target bar code embedded with the compressed target code by encoding the compressed target code, wherein the target code comprises at least one of the following logical functions:
        a first logical function for allowing a scanning device with a read permission to run the target code,
        a second logical function for allowing the target code to be run within a validity period, and
        a third logical function for calling and configuring target hardware in the scanning device to execute a target operation.

2. The method of claim 1, wherein:
    before generating the target bar code embedded with the target code by encoding the target code, the method further comprises:
        encrypting the target code to obtain an encrypted target code; and
    generating the target bar code embedded with the target code by encoding the target code comprise:
        generating the target bar code embedded with the encrypted target code by encoding the encrypted target code.

3. The method of claim 1, wherein when the target bar code is scanned by the scanning device, a scanning operation causes the scanning device to decode the target bar code to obtain the target code embedded in the target bar code, the scanning operation further causes the scanning device to execute the target code.

4. The method of claim 3, wherein:
    the target code comprises a designated location used for access control, and identification information of a target hardware;
    the target hardware comprises a location positioning hardware;
    when the scanning device execute the target code, the scanning device is configured to:
        call the location positioning hardware to obtain a current location of the scanning device;
        compare the current location with a designated location carried in the target bar code; and
        determine access is allowed in response to the current location matching with the designated location.

5. The method of claim 1, wherein:
    the source code is programmed using a first type programming language; and
    in response to a virtual machine in the scanning device having a read permission to run the target code, the scanning device executes the target code via the virtual machine.

6. The method of claim 1, wherein:
    the source code is programmed using a first type programming language and the target code is compiled with a compiler for the first type programming language; and
    a virtual machine in the scanning device executes the target code by:
        converting the target code based on a second type programming language which is suitable to run in the virtual machine, to obtain a converted target code; and
        executing the converted target code.

7. A device for bar code generation, comprising a memory for storing computer instructions and a processor in communication with the memory, wherein, when the processor executes the computer instructions, the processor is configured to cause the device to:
    obtain a target code by compiling a source code, the target code being self-contained executable code comprising target computer readable instructions and comprising logic functions, wherein the target computer readable instructions are executable by a processor;
    compress code bytes of the target code to obtain a compressed target code; and
    generate a target bar code embedded with the compressed target code by encoding the compressed target code, wherein the target code comprises at least one of the following logical functions:
        a first logical function for allowing a scanning device with a read permission to run the target code,
        a second logical function for allowing the target code to be run within a validity period, and
        a third logical function for calling and configuring target hardware in the scanning device to execute a target operation.

8. The device of claim 7, wherein:
    before the processor is configured to cause the device to generate the target bar code embedded with the target code by encoding the target code, the processor is further configured to cause the device to:
        encrypt the target code to obtain an encrypted target code; and when the processor is configured to cause the device to generate the target bar code embedded with the target code by encoding the target code, the processor is configured to cause the device to:
  generate the target bar code embedded with the encrypted target code by encoding the encrypted target code.

9. The device of claim 7, wherein when the target bar code is scanned by the scanning device, a scanning operation causes the scanning device to decode the target bar code to obtain the target code embedded in the target bar code, the scanning operation further causes the scanning device to execute the target code.

10. The device of claim 9, wherein:
  the target code comprises a designated location used for access control, and identification information of a target hardware;
  the target hardware comprises a location positioning hardware;
  when the scanning device execute the target code, the scanning device is configured to:
    call the location positioning hardware to obtain a current location of the scanning device;
    compare the current location with a designated location carried in the target bar code; and
    determine access is allowed in response to the current location matching with the designated location.

11. The device of claim 7, wherein:
  the source code is programmed using a first type programming language; and
  in response to a virtual machine in the scanning device having a read permission to run the target code, the scanning device executes the target code via the virtual machine.

12. The device of claim 7, wherein:
  the source code is programmed using a first type programming language and the target code is compiled with a compiler for the first type programming language; and
  a virtual machine in the scanning device executes the target code by:
    converting the target code based on a second type programming language which is suitable to run in the virtual machine, to obtain a converted target code; and
    executing the converted target code.

13. A non-transitory storage medium for storing computer readable instructions, the computer readable instructions, when executed by a processor in a device, causing the processor to:
  obtain a target code by compiling a source code, the target code being self-contained executable code comprising target computer readable instructions and comprising logic functions, wherein the target computer readable instructions are executable by a processor;
  compress code bytes of the target code to obtain a compressed target code; and
  generate a target bar code embedded with the compressed target code by encoding the compressed target code,
  wherein the target code comprises at least one of the following logical functions:
    a first logical function for allowing a scanning device with a read permission to run the target code,
    a second logical function for allowing the target code to be run within a validity period, and
    third logical function for calling and configuring target hardware in the scanning device to execute a target operation.

14. The non-transitory storage medium of claim 13, wherein:
  before the computer readable instructions cause the processor to generate the target bar code embedded with the target code by encoding the target code, the computer readable instructions further cause the processor to:
    encrypt the target code to obtain an encrypted target code; and
  when the computer readable instructions cause the processor to generate the target bar code embedded with the target code by encoding the target code, the computer readable instructions cause the processor to:
    generate the target bar code embedded with the encrypted target code by encoding the encrypted target code.

15. The non-transitory storage medium of claim 13, wherein when the target bar code is scanned by the scanning device, a scanning operation causes the scanning device to decode the target bar code to obtain the target code embedded in the target bar code, the scanning operation further causes the scanning device to execute the target code.

16. The non-transitory storage medium of claim 15, wherein:
  the target code comprises a designated location used for access control, and identification information of a target hardware;
  the target hardware comprises a location positioning hardware;
  when the scanning device execute the target code, the scanning device is configured to:
    call the location positioning hardware to obtain a current location of the scanning device;
    compare the current location with a designated location carried in the target bar code; and
    determine access is allowed in response to the current location matching with the designated location.

17. The non-transitory storage medium of claim 13, wherein:
  the source code is programmed using a first type programming language and the target code is compiled with a compiler for the first type programming language; and
  a virtual machine in the scanning device executes the target code by:
    converting the target code based on a second type programming language which is suitable to run in the virtual machine, to obtain a converted target code; and
    executing the converted target code.

* * * * *